(12) United States Patent
Dröse et al.

(10) Patent No.: US 6,291,622 B1
(45) Date of Patent: Sep. 18, 2001

(54) PROCESS AND APPARATUS FOR CONTINUOUS HYDROSILYLATION

(75) Inventors: Jürgen Dröse, Essen; Hubertus Geisler, Werl; Wolfgang Hiersche, Essen; Klaus-Dieter Klein, Mülheim; Wilfried Knott, Essen; Andreas Mehrwald, Essen; Dagmar Windbiel, Essen, all of (DE)

(73) Assignee: Goldschmidt AG, Essen (DE)

( * ) Notice: Subject to any disclaimer, the term of this patent is extended or adjusted under 35 U.S.C. 154(b) by 0 days.

(21) Appl. No.: 09/470,533

(22) Filed: Dec. 22, 1999

(30) Foreign Application Priority Data

Dec. 23, 1998 (DE) .............................. 198 59 759

(51) Int. Cl.$^7$ .................................. C08G 77/06
(52) U.S. Cl. ................ 528/31; 528/25; 528/29; 528/15; 556/445; 526/64; 526/65
(58) Field of Search .................... 528/15, 31, 25, 528/29; 526/64, 65; 556/445

(56) References Cited

U.S. PATENT DOCUMENTS 5,986,022   11/1999  Austin et al. ..................... 526/65

FOREIGN PATENT DOCUMENTS 196 19 138 A1   11/1997  (DE) .
196 32 157 A1   2/1998   (DE) .
WO 98/05700     2/1998   (WO) .

OTHER PUBLICATIONS

Marciniec, B., et al., (1987) "Catalysis of hydrosilylation XIII. Gas–phase hydrosilylation of acetylene by trichlorosilane on functionalised silica supported rhodium and ruthenium phosphine complexes", *Applied Organometallic Chemistry*, pp 267–273. (No month).

Marciniec, B., et al., (1987) "Catalysis of hydrosilylation. XV. A poly(phosphino–organosiloxanyl)silicate–supported rhodium(I) catalyst for gas–phase hydrosilylation of acetylene", *Applied Organometallic Chemistry*, pp 459–463. (No month).

*Primary Examiner*—Margaret G. Moore
(74) *Attorney, Agent, or Firm*—Scully, Scott, Murphy & Presser

(57) ABSTRACT

A continuous process for preparing organomodified polysiloxanes by the transition metal-catalyzed addition of polysiloxanes containing SiH groups onto substances containing C—C multiple bonds, in particular a process for the continuous hydrosilylation of substances containing C—C multiple bonds, which comprises introducing the reactants, in the presence or absence of a homogeneous or heterogeneous catalyst, into a loop-like, heatable and coolable reaction circuit which has a static mixing element and/or a dynamic mixing element to mix starting materials and product formed, leaving the reaction mixture in the reaction circuit until a predetermined degree of conversion has been reached and subsequently transferring the reaction mixture still containing starting materials to a tube reactor to complete the reaction and taking it off via a receiver. In addition, a suitable industrial apparatus for carrying out the process of the invention is described.

3 Claims, 3 Drawing Sheets

PROCESS AND APPARATUS FOR CONTINUOUS HYDROSILYLATION

FIELD OF INVENTION

The present invention relates to a continuous process for preparing organomodified polysiloxanes by a transition metal-catalyzed addition of polysiloxanes containing SiH groups onto substances containing C—C multiple bonds. In addition, a suitable industrial apparatus for carrying out the process of the present invention is also described.

BACKGROUND OF THE INVENTION

Among processes for forming and modifying organosiloxanes, hydrosilylation catalyzed by transition metals is of particular importance since hydrosilylations make a wide variety of SiC linkages possible. However, regardless of the wide application opportunities for this reaction, industrial implementation of prior art hydrosilylations is frequently accompanied by considerable difficulties. Central to these problems is the catalyst activity which can change over time and is subject to many interfering influences. Since hydrosilylation reactions liberate energy (i.e., the reactions are exothermic), a fluctuating catalyst activity in batch processes not infrequently leads to critical operational states because reactants can accumulate in between and can thus build up a hazard potential. The batch process represents the customary state of the art for industrial hydrosilylations, not least because experience has shown that a preactivation phase to form the catalytically active species from the inactive precursor material is absolutely necessary. The fluctuating reaction behaviors of industrial hydrosilylation reactions require the presence of many qualified employees.

One particular hazard potential results from the material systems in hydrosilylation processes, which systems have a high hydride hydrogen density. Apart from monomeric silanes, specific mention is made of the derivatives of poly(methylhydrogen)siloxane.

Along with the hazard potential, the critical systems also give undesired by-products, i.e., the selectivity of the intended reaction suffers.

The known chemical processes for preparing organofunctionalized poly(methylhydrogen)siloxanes therefore make conspicuous efforts to minimize the steady-state concentration of active SiH groups in the SiC linkage step.

For example, WO 98/05700 describes a (semi)continuous process for preparing multifunctional polyorganosiloxanes containing Si-alkyl and Si-alkoxy groups in a multistage reaction apparatus comprising a combination of a dehydrocondensation reactor with a hydrosilylation reactor. The dehydrocondensation reactor is supplied with an SiH-containing polyorganosiloxane and a deficiency, based on the polyorganosiloxane, of an alkyl or thioalkyl in the presence of a platinum catalyst, forming, with liberation of $H_2$, a mixed alkoxyhydrogensiloxane or thioalkoxyhydrogensiloxane which is then immediately subjected to alkylation by an olefin to form an SiC bond in a downstream hydrosilylation reactor. Attention is paid in WO 98/05700 (see, Page 2, line 29-Page 3, line 3) to the hazard potential involved in handling SiH-containing compounds, even compounds having partly alkoxy- or thioalkoxy-functionalized chains. For this reason, the actual hydrosilylation is therefore deliberately carried out only after the partially deactivating reaction (dehydrocondensation); operation of this process brings with it the technical problem of ensuring complete removal of alcohol/thiol and hydrogen gas prior to the hydrosilylation. In terms of the apparatus, a complicated and costly solution is therefore necessary.

Continuous hydrosilylation processes which are already known per se also seek to lower the in-situ concentration of active SiH groups. DE 196 32 157 A discloses a process for the continuous preparation of organosilicon compounds of the 3-halopropyl-organosilane type having the general structure $R_bH_{3-a-b}X_aSiCH_2CH_2CH_2Y$ by reaction of an allyl halide with an excess of a silane having at least one H atom. Propyl-organosilanes which cannot be utilized are formed as undesired by-products. The essential feature of this prior art process is that by-product formation is suppressed by setting a partial conversion of the starting materials of 10–80%, based on the component present in a deficiency.

A further process for continuously carrying out hydrosilylation reactions is disclosed in DE 196 19 138 A. This document describes a process for preparing vinylated organosilicon compounds in which an organosilicon compound containing at least one SiH group is reacted with an excess of acetylene in a largely inert liquid phase in the presence of a catalyst. To ensure intensive mixing of the reaction matrix, a jet loop reactor is employed.

Continuous gas-phase processes in a flow reactor which have been previously described include: the molecular addition of acetylene onto methyldichlorosilane over a Wilkinson catalyst immobilized on chrysotile asbestos (Appl. Organomet. Chem. (1987), 1 (5), 459–63); and the hydrosilylation of acetylene using trichlorosilane over Rh- and Ru-phosphine complexes fixed to $SiO_2$, which proceeds with limited selectivity (Appl. Organomet. Chem. (1987), 1 (3), 267–73).

The prior art thus documents three methods of diluting active SiH groups:
(i) the partial conversion procedure;
(ii) the use of an inert liquid phase; and
(iii) the reaction in a gas space.

SUMMARY OF THE INVENTION

In view of the drawbacks with prior art hydrosilylation processes, it is an object of the present invention to provide a process and an apparatus which make it possible to carry out the hydrosilylation reaction economically and reproducibly while avoiding known hazardous potentials even in difficult material systems, while at the same time refraining from using a complicated and expensive apparatus. In addition, the process should ensure consistently high product quality while making sparing use of high-priced noble metal catalysts. Furthermore, the process should be usable for virtually complete conversion, without use of an inert auxiliary phase and also for relatively high molecular weight reactants which cannot be vaporized without decomposition.

DETAILED DESCRIPTION OF THE INVENTION

The abovementioned object is achieved, in a first embodiment of the present invention, by a process for the continuous hydrosilylation of substances containing C—C multiple bonds, which comprises introducing the reactants, in the presence or absence of a homogeneous or heterogeneous catalyst, into a loop-like, heatable and coolable reaction circuit which has a static mixing element and/or a dynamic mixing element to mix starting materials and product formed, leaving the reaction mixture in the reaction circuit until a predetermined degree of conversion has been reached and subsequently transferring the reaction mixture still containing starting materials to a tube reactor to complete the reaction and taking the product off via a receiver.

Figure 1:
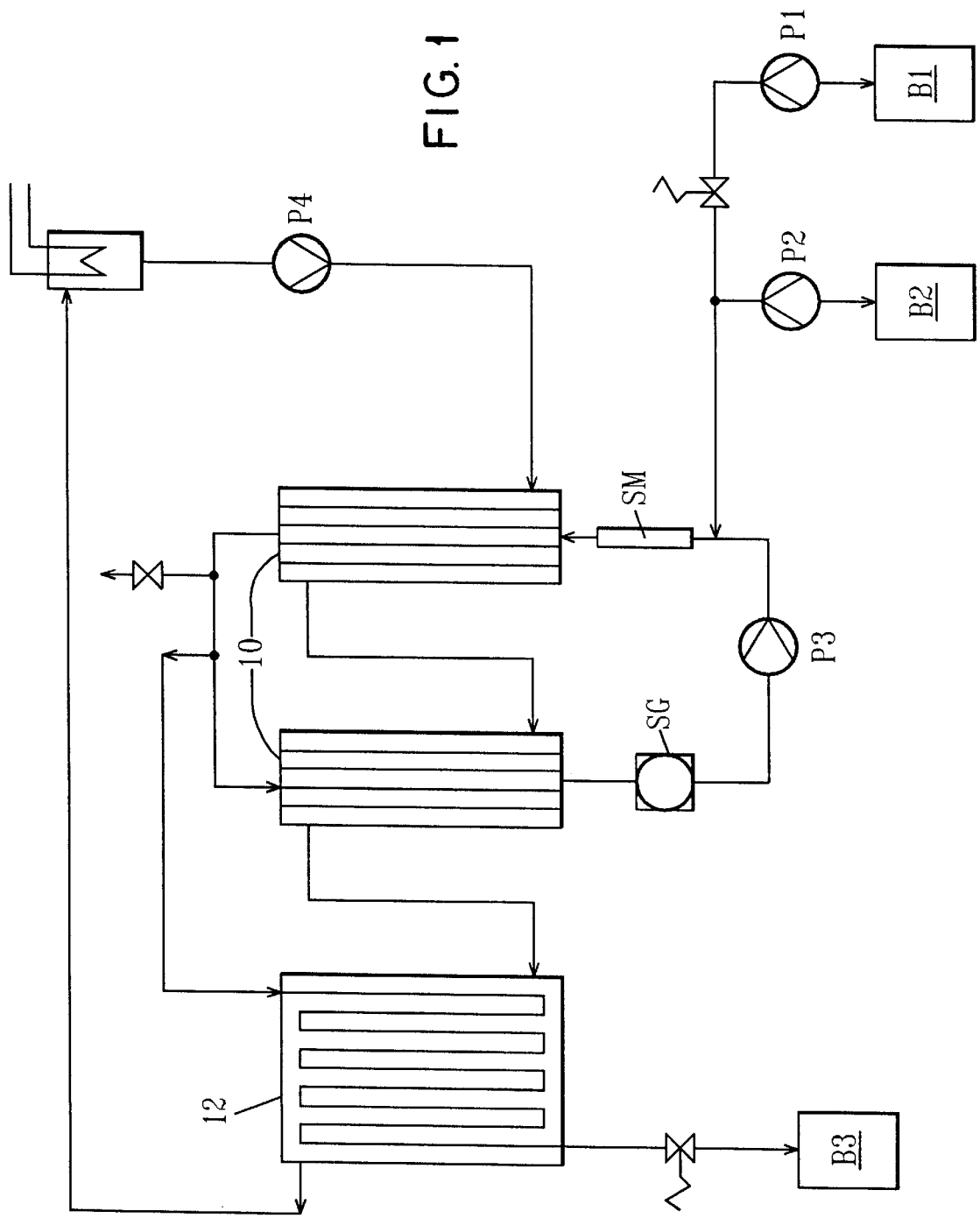
FIG. 1 is a schematic showing a reaction system of the present invention.

The principle on which the present invention is based is shown schematically in FIG. 1.

The material stream is highlighted by a thicker line compared to the oil circuit serving to regulate the temperature (cooling or heating) of the plant items. The starting materials, if desired admixed with catalyst, in reservoirs B1 and B2 are fed into the loop reactor 10 by means of metering pumps P1 and P2. Continual circulation of the reactant mixture within the loop is ensured by pump P3. To aid intensive mixing of the reaction matrix, static mixing elements (SM) are integrated into the loop. After a predetermined residence time, the reaction mixture passes into tube reactor 12. When the after-reaction in the tube reactor is complete the product is collected in receiver B3.

Figure 2:
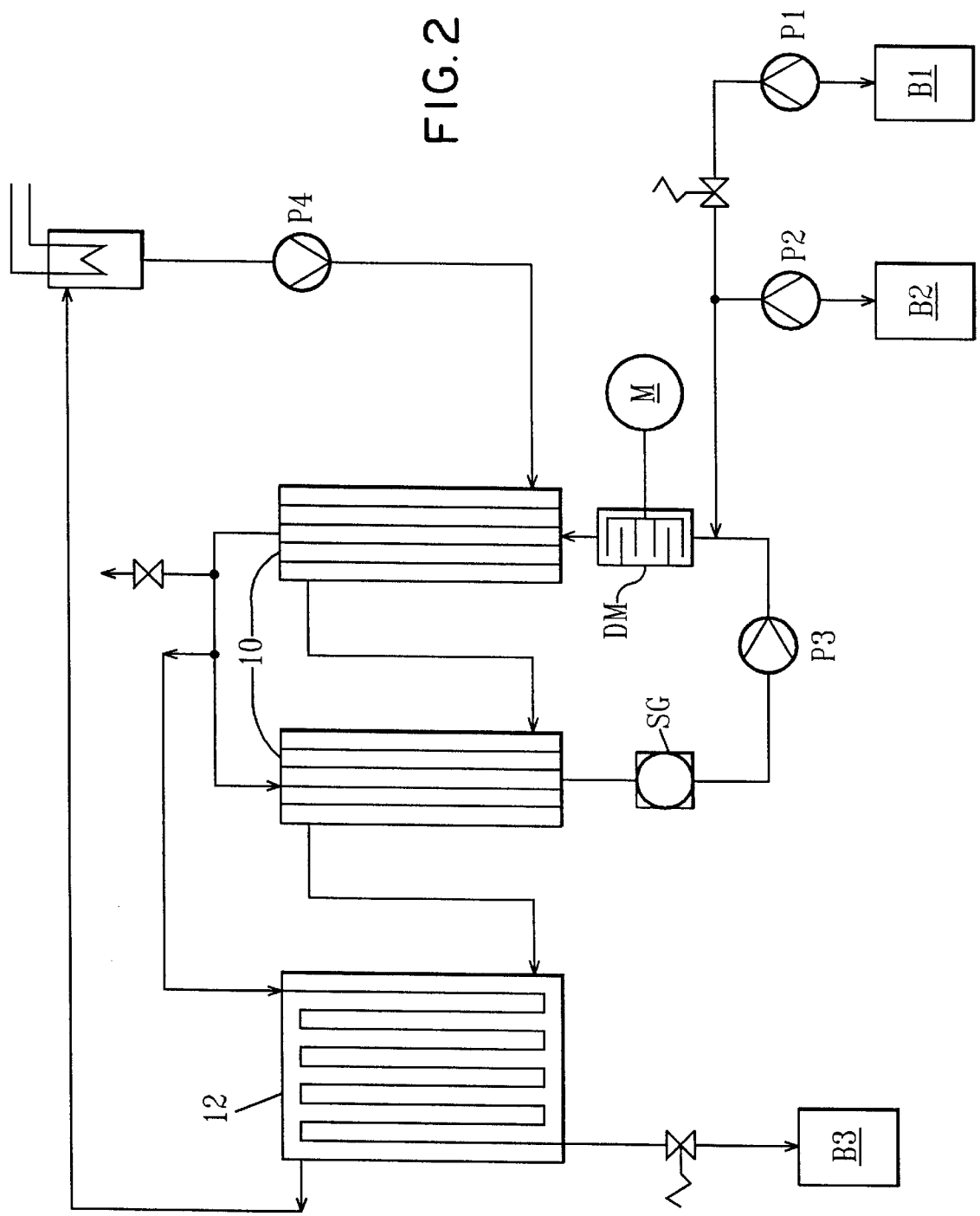
FIG. 2 is a schematic showing another reaction system of the present invention.

It has surprisingly been found that the specified requirements are met by a reactor system in which metered reactant streams are fed in the presence of a heterogeneous or homogeneous noble metal catalyst through a heatable and coolable loop reactor in combination with a heatable and coolable tube reactor. Here, the loop reactor assumes the function of making the critical starting phase at the commencement of hydrosilylation controllable. The accumulation of critical amounts of starting materials is combatted in the loop reactor by rapid and intensive mixing which is ensured both by the installation of static mixing elements and by a high circulation performance of the integrated pump. If desired, the static mixing elements can be replaced by a dynamic mixer (DM) operated in the flowing stream, for example one operating according to the rotor/stator principle, or a combination of the two can be used (FIG. 2). Individually and/or in combination, these measures effect timely, rapid reaction of the substance bearing SiH groups and the substance containing a C—C multiple bond. The tube reactor connected to the loop reactor via an overflow provides for the small degree of exothermic after-reaction of the reaction mixture.

A further embodiment of the present invention thus comprises an apparatus for the continuous hydrosilylation of substances containing at least one C—C multiple bond, comprising a reservoir (B1) for holding the substance, if desired admixed with a catalyst, a reservoir (B2) for holding the hydrosilylation component, conveying devices (P1, P2) for introducing a starting material stream into a loop-like, heatable and coolable reaction circuit 10 containing a static mixing (SM) element or a dynamic mixing element (DM) for mixing the starting materials and the product formed, facilities for removing the heat of reaction, a tube reactor 12 for completing the reaction and facilities for collecting the product (B3).

Figure 3:
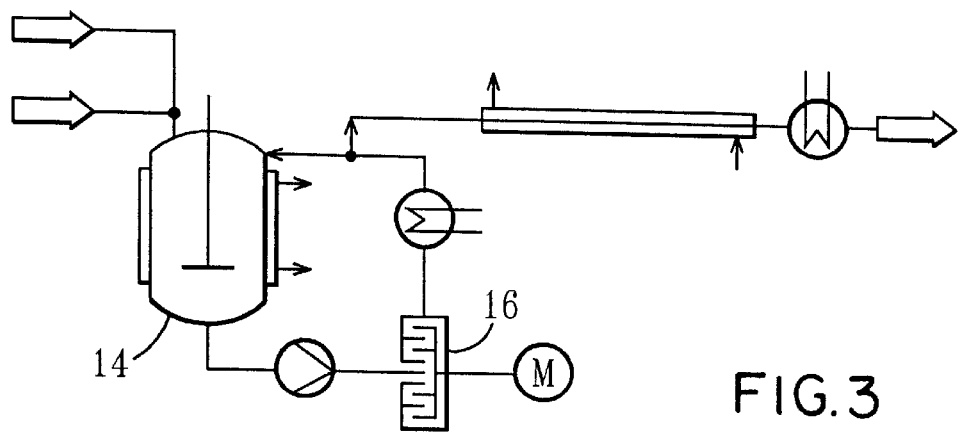
FIG. 3. is a schematic showing a stirred vessel which is equipped with a dynamic flow mixer.
Figure 4:
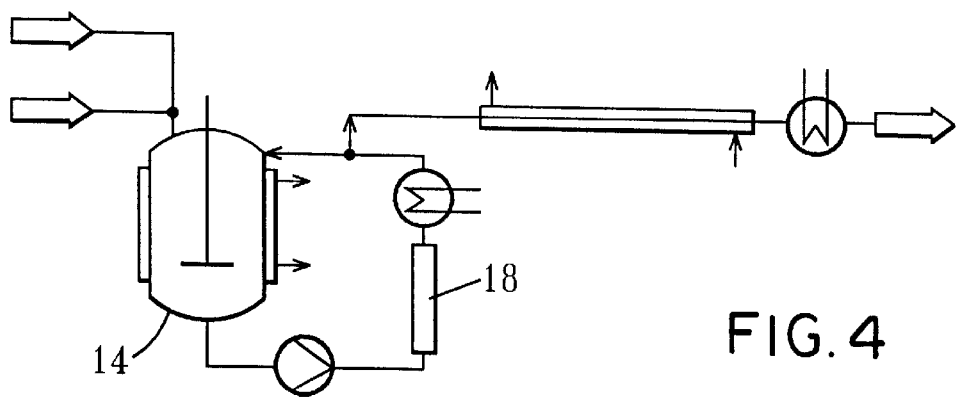
FIG. 4. is a schematic showing a stirred vessel which is equipped with a static mixing element.
Figure 5:
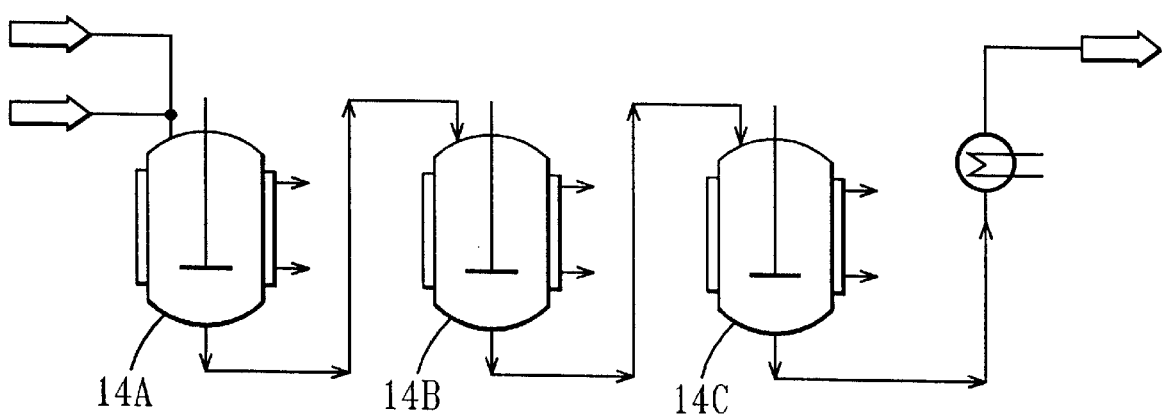
FIG. 5. is a schematic showing an alternative reaction system of the present invention which includes a cascade of stirred vessels comprising two or more stirred vessels connected in series.

A stirred vessel 14 which is equipped with a static mixing element 18 (as shown in FIG. 4) or with a dynamic flow mixer 16 (as shown in FIG. 3) can be integrated into the loop reactor circuit. An alternative reaction system which is also suitable for the process of the invention is a cascade of stirred vessels comprising two or more stirred vessels (14A, 14B, 14C) connected in series (FIG. 5) which can, if desired, be used for the after-catalysis.

An observation which is puzzling to a person skilled in the art is that, compared to conventional batch technology, significantly smaller amounts of noble metal catalyst have to be used to achieve quantitative conversions. The smaller consumption of noble metal is not only of interest from a cost reduction point of view, but also has a direct influence on the product quality achieved since certain instances of undesirable discoloration are directly attributable to the presence of transition metal compounds. Furthermore, separation of the catalyst from the reaction mixture is made easier.

The space-time yields achievable using the reaction system according to the present invention are significantly superior to the productivity of the conventional stirred vessel technology.

This makes it possible to build small and compact production plants which provide excellent output rates in a limited space.

A further favorable aspect of the present invention is that the chemoselectivity of the hydrosilylation reaction is combined directly with the high space-time yields of the process described. In particular, ambifunctional or polyfunctional reactants (e.g., OH-functional allyl polyethers) can be converted into the target products in good yields.

In a particular embodiment of the present invention, a noble metal catalyst fixed to a support is integrated into the reaction loop so that the catalyst promotes the SiC bond formation reaction in the flowing fluid in heterogeneous form. In this way, product contamination with transition metal compounds is minimized, so that time-consuming filtration steps for removing the catalyst become unnecessary.

The process of the present invention ensures a consistently high product quality and also makes it possible to achieve a high degree of automation in the production of organomodified siloxanes. Setting the throughput of the metering elements for feeding in the starting materials directly defines the residence time in the reactor system and thus the conversion to be achieved at a particular temperature. Coupled with a customary instrumentation system, the process of the present invention or the apparatus of the invention allows, for example when using integrated near IR sensors, the process parameters to be matched to the current operating state on the basis of on-line measurements. This enables subjective human errors in carrying out the reaction to be eliminated. Furthermore, as a consequence of the defined input of starting materials into a reaction loop, accumulation of unreacted starting materials is prevented, the initial heat liberated is safely removed and safe operation of the process is ensured.

As an alternative to the variable plant parameters, a number of prescribed products can also be produced simply and reproducibly using fixed plant parameters without instrumentation.

The following examples are given to illustrate the present invention and to demonstrate some of the advantages that can arise from the same.

EXAMPLES

Example 1

1379 g of heptamethyltrisiloxane (4.99 eq of SiH/kg) were placed in the vessel B1 and 4491 g of a hydroxy-functional allyl polyether (M=about 522 g/mol, structure: $CH_2=CH—CH_2—O—(EO)_{6.3}—(PO)_{3.2}—OH$, iodine number: 48.6 g of I/100 g) in which 18.1 mg of cis-diaminoplatinum(II) dichloride (2 ppm of Pt) are uniformly suspended were placed in the vessel B2. At pumping rates of 280 ml/h and 720 ml/h, the metering pumps P1 and P2 conveyed the reactants into the loop reactor ($V_{loop}$=1 l) which had previously been heated to 130° C. The pump P3 circulated the reaction mixture at 800–1000 l/h. A pressure of 4 bar was established in the reaction system. After a mean residence time of 2 hours, the product left the downstream tube reactor ($V_t$=1 l) and was collected in the receiver B3.

The gas-volumetric SiH determination (decomposition using sodium butoxide) indicated a final conversion of >99%. Accompanying $^{29}$Si-NMR spectroscopy showed that the signal at δ=−36.5 ppm characteristic of the SiH group had completely disappeared.

Example 2

Using a procedure analogous to Example 1, 1637 g of a polydimethylsiloxane having lateral SiH functions (structure: $MD_{20.5}D^H{}_5M$, SiH value: 2.5 eq/kg) were placed in vessel B1 and 4564 g of a hydroxy-functional allyl polyether (M=about 838 g/mol, $CH_2=CH—CH_2—O—(EO)_{13}—(PO)_{3.5}—OH$, iodine number: 30.3 g of I/100 g) in which 19.1 mg of cis-diaminoplatinum(II) dichloride (2 ppm of Pt) were suspended were placed in vessel B2. The metering pumps P1 and P2 conveyed the reactants in a stoichiometric ratio of 1.3 eq of polyether/1 eq of SiH-siloxane into the reaction loop which had previously been heated to 130° C. After a mean residence time of 2 hours, an addition product having an SiH conversion of 98% was collected in B3. $^{29}$Si-NMR spectroscopy demonstrated that the product had the target structure.

Comparative Example 1

1140 g of a hydroxy-functional allyl polyether (M=about 522 g/mol, $CH_2=CH—CH_2—O—(EO)_{6.3}—(PO)_{3.2}—OH$, iodine number: 48.6 g of I/100 g) together with 22.9 mg of cisdiaminoplatinum(II) dichloride (≅10 ppm) and 35 g of heptamethyltrisiloxane (4.99 eq of SiH/kg) were placed in a 2000 ml four-necked flask fitted with precision glass stirrer, dropping funnel and reflux condenser while stirring vigorously and were quickly heated to 100° C. The exothermic reaction which occurred led to a temperature rise to 125° C. At this temperature, a further 315 g of heptamethyltrisiloxane were added dropwise at such a rate that the temperature of the reaction mixture did not drop but the gas evolution did not become too great either. After addition was complete (1 hour), the SiH conversion was determined gas-volumetrically (90.7%). The reaction mixture was held at 130° C. for a further 7 hours and the conversion was determined every hour. After 7 hours, a final conversion of 96.4% had been reached.

Comparative Example 2

Using a procedure analogous to Comparative Example 1, 1254 g of a hydroxy-functional allyl polyether (M=about 838 g/mol, $CH_2=CH=CH_2—O—(EO)_{13}—(PO)_{3.5}—OH$, iodine number: 30.3 g of I/100 g) together with 26.2 mg (≅10 ppm) of cisdiaminoplatinum(II) dichloride and 45 g of a polydimethylsiloxane having lateral SiH functions (structure: $MD_{20.5}D^H{}_5M$, SiH value: 2.5 eq/kg) were placed in a 2000 ml four-necked flask fitted with precision glass stirrer, dropping funnel and reflux condenser while stirring vigorously and were quickly heated to 80° C. The exothermic reaction which occurred caused the temperature of the mixture to rise to 112° C. After the initial reaction had abated, the reaction mixture was heated to 130° C. and a further 405 g of the hydrogen-siloxane were then added dropwise at such a rate that very little gas evolution was observed and the temperature of the reaction mixture did not drop below 125° C. After addition was complete (about 2 hours), the SiH conversion determined gas-volumetrically was 89% and during an after-reaction phase of a further two hours reached 97%.

While this invention has been partially shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A process for the continuous hydrosilylation of a substance containing C—C multiple bonds, said process comprising: introducing at least one compound containing a C—C multiple bond and a polysiloxane containing SiH groups into a heatable and coolable loop reactor, which has a mixing element selected from the group consisting of static mixing element, a dynamic mixing element, and a combination thereof to mix said materials and product formed; leaving the reaction mixture in the loop reactor until a predermined degree of conversion has been reached; transferring the reaction mixture still containing starting material either to a tube reactor or to a cascade of stirred vessels to complete hydrosilation; and taking product off via a receiver.

2. The process according to claim 1, wherein the reaction mixture still containing starting materials is transferred to the tube reactor.

3. The process according to claim 1, wherein the reaction mixture still containing starting materials is transferred to the cascade of stirred vessels.

* * * * *